(12) United States Patent
Lin

(10) Patent No.: US 7,567,386 B2
(45) Date of Patent: Jul. 28, 2009

(54) DICHROIC MIRROR

(75) Inventor: Juin-Hong Lin, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 34 days.

(21) Appl. No.: 11/957,339

(22) Filed: Dec. 14, 2007

(65) Prior Publication Data

US 2009/0128920 A1      May 21, 2009

(30) Foreign Application Priority Data

Nov. 15, 2007     (CN) .................. 2007 1 0202549

(51) Int. Cl.
*G02B 27/14*     (2006.01)
(52) U.S. Cl. ............ 359/634; 359/359; 359/586; 359/883
(58) Field of Classification Search ........... 359/359, 359/586, 588, 634, 883, 884; 353/98; 349/5
See application file for complete search history.

(56) References Cited

U.S. PATENT DOCUMENTS 6,310,729 B1 * 10/2001 Tsukamoto ............... 359/634
7,165,846 B2 * 1/2007 Sannohe ..................... 353/31

* cited by examiner

*Primary Examiner*—Joseph Martinez

(57) ABSTRACT

A dichroic mirror includes a substrate and a dielectric multilayered film formed on a surface of the substrate. The dielectric multilayered film includes a first period layer with a structure represented by a formula $(0.7H 1.4L 0.7H)^n$ and a second period layer with a structure represented by a formula $(2H\mu L)^m$ in order from the substrate side. Wherein H represents a high refractive index layer and L represents a low refractive index layer, H and L are set at ¼ lambda of a reference wavelength associated with the film, $\mu$ is a coefficient of the L, and the superscript represents the number of repetitions of the structure, enclosed by the parentheses, used in the correspond first period layer or second period layer.

9 Claims, 6 Drawing Sheets

DICHROIC MIRROR

TECHNICAL FIELD

The present invention relates to a dichroic mirror, particularly, to a dichroic mirror can be used for reflecting red light.

DESCRIPTION OF RELATED ART

FIG. 5 and FIG. 6 are graphs showing spectral transmittance characteristics of two typical red reflecting dichroic mirrors. The structure of the films formed on the two dichroic mirrors are represented by the formulas $(0.5HL0.5H)^{12}$ and $(2HL)^{14}$ respectively, wherein H represents a high refractive index layer and L represents a low refractive index layer, H and L are set at ¼ lambda of a reference wavelength associated with the film, and the superscript represents the number of repetitions of the structure, enclosed by the parentheses, used in the film.

The light has an obviously wider reflected S-polarized component wavelength range than the reflected P-polarized component wavelength range and therefore the reflection characteristics of the two typical red reflecting dichroic mirrors have polarization dependency, as shown in FIG. 5 and FIG. 6. When these dichroic mirrors are used in a projector, brightness and contrast levels are undesirably decreased, and a clear image cannot be projected.

What is needed, therefore, is a dichroic mirror that can overcome the above-described shortcomings.

SUMMARY

In accordance with one present embodiment, a dichroic mirror includes a substrate and a dielectric multilayered film formed on a surface of the substrate. The dielectric multilayered film includes a first period layer with a structure represented by a formula $(0.7H1.4L0.7H)^n$ and a second period layer with a structure represented by a formula $(2H\mu L)^m$ in order from the substrate side. Wherein H represents a high refractive index layer and L represents a low refractive index layer, H and L are each set at ¼ lambda of a reference wavelength associated with the film, μ is a coefficient of the L, and the superscript represents the number of repetitions of the structure, enclosed by the parentheses, used in the correspond first period layer or second period layer.

BRIEF DESCRIPTION OF THE DRAWING

Many aspects of the present dichroic mirror can be better understood with reference to the following drawings. The components in the drawing are not necessarily drawn to scale, the emphasis instead being placed upon clearly illustrating the principles of the present dichroic mirror.

DETAILED DESCRIPTION OF THE EMBODIMENTS

Embodiments of the present invention will now be described in detail below, with reference to the drawings.

Figure 1:
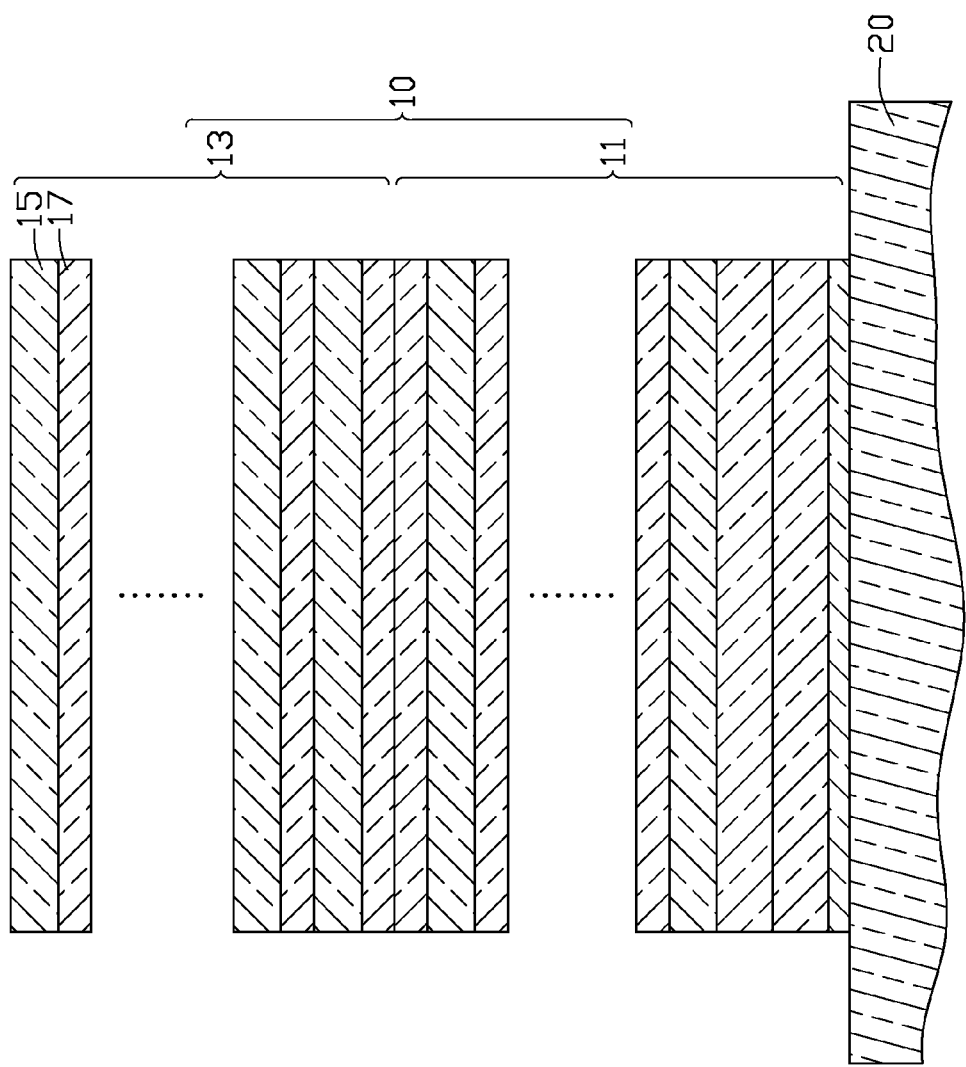
FIG. 1 is a schematic view of a dichroic mirror according to a present embodiment of the present invention.

Referring to FIG. 1, a dichroic mirror 100, according to an embodiment, is shown. The dichroic mirror 100 includes a substrate 20 and a dielectric multilayered film 10 formed on a surface of the substrate 20. The material of the substrate 20 can be selected from glass or plastic.

The dielectric multilayered film 10 includes a first period layer 11 and a second period layer 13. Each of the first period layer 11 and the second period layer 13 includes alternately formed high refractive index layers 15 and low refractive index layers 17.

The structure of the first period layer 11 is represented by a formula $(0.7H1.4L0.7H)^n$, wherein H represents a high refractive index layer and L represents a low refractive index layer, H and L are set at ¼ lambda of a reference wavelength associated with the film, the n represents the number of repetitions of the structure, enclosed by the parentheses, used in the first period layer 11. The reference wavelength is in a range from 500 nm to 700 nm. The value of the n is in a range from 8 to 12.

The structure of the second period layer 13 is represented by a formula $(2H\mu L)^m$, Wherein H represents a high refractive index layer and L represents a low refractive index layer, H and L are set at ¼ lambda of a reference wavelength associated with the film, μ is a coefficient of the L, the m represents the number of repetitions of the structure, enclosed by the parentheses. The reference wavelength is in a range from 500 nm to 700 nm. The value of the m is in a range from 15 to 20. The value of the μ is in a range from 0 to 1.

In the present embodiment, a material with refractive index in a range from 1.4 to 1.5 is used as the low refractive index material. The low refractive index material can be selected from a group consisting of $MgF_2$ and $SiO_2$. A material with refractive index in a range from 2.0 to 2.5 is used as the high refractive index material. The high refractive index material can be selected from a group consisting of $TiO_2$, $Ta_2O_5$, and $Nb_2O_5$.

Figure 2:
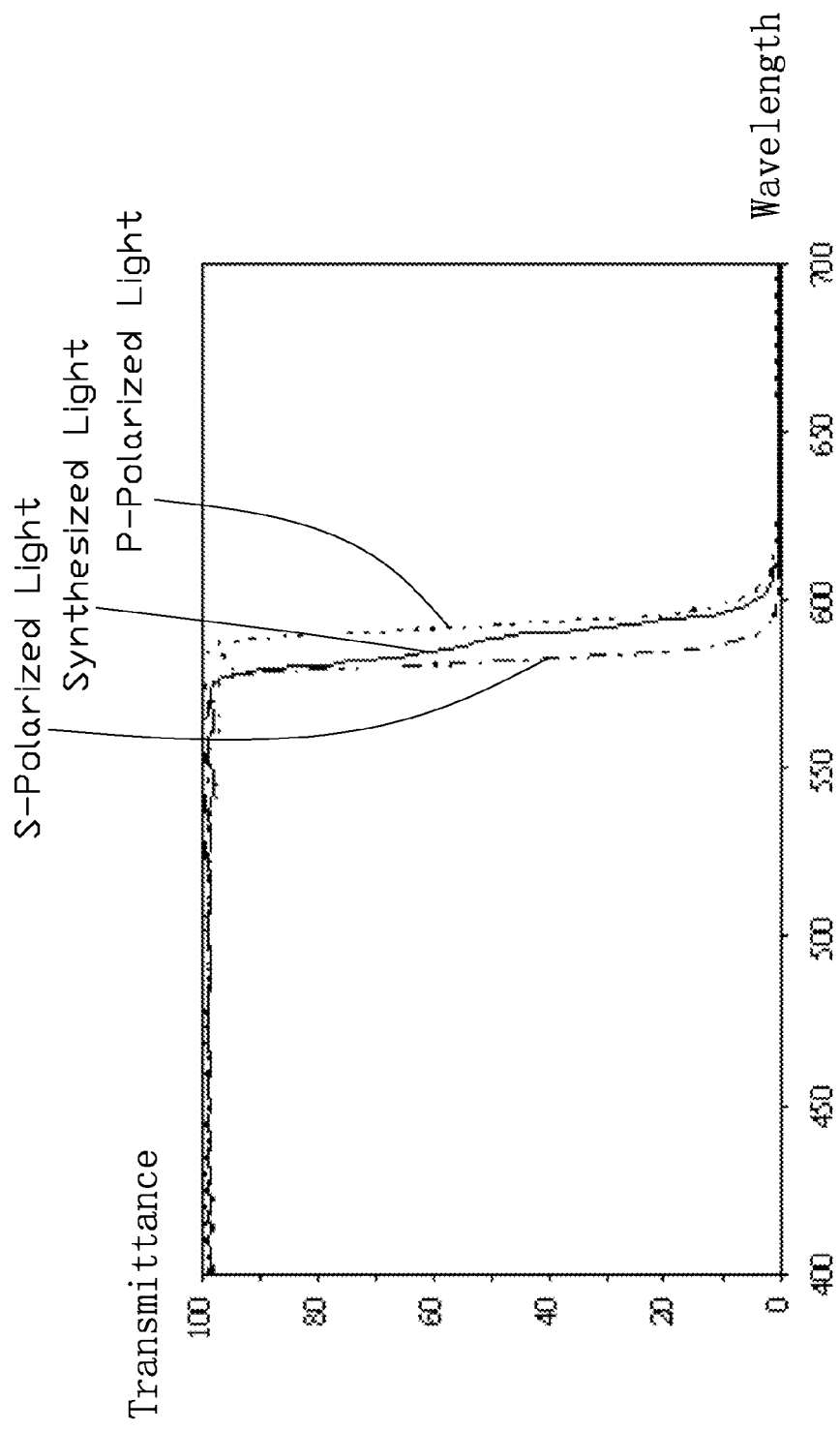
FIG. 2 is a graph showing transmittance characteristics of a dichroic mirror according to a first exemplary embodiment of the present invention.
Figure 3:
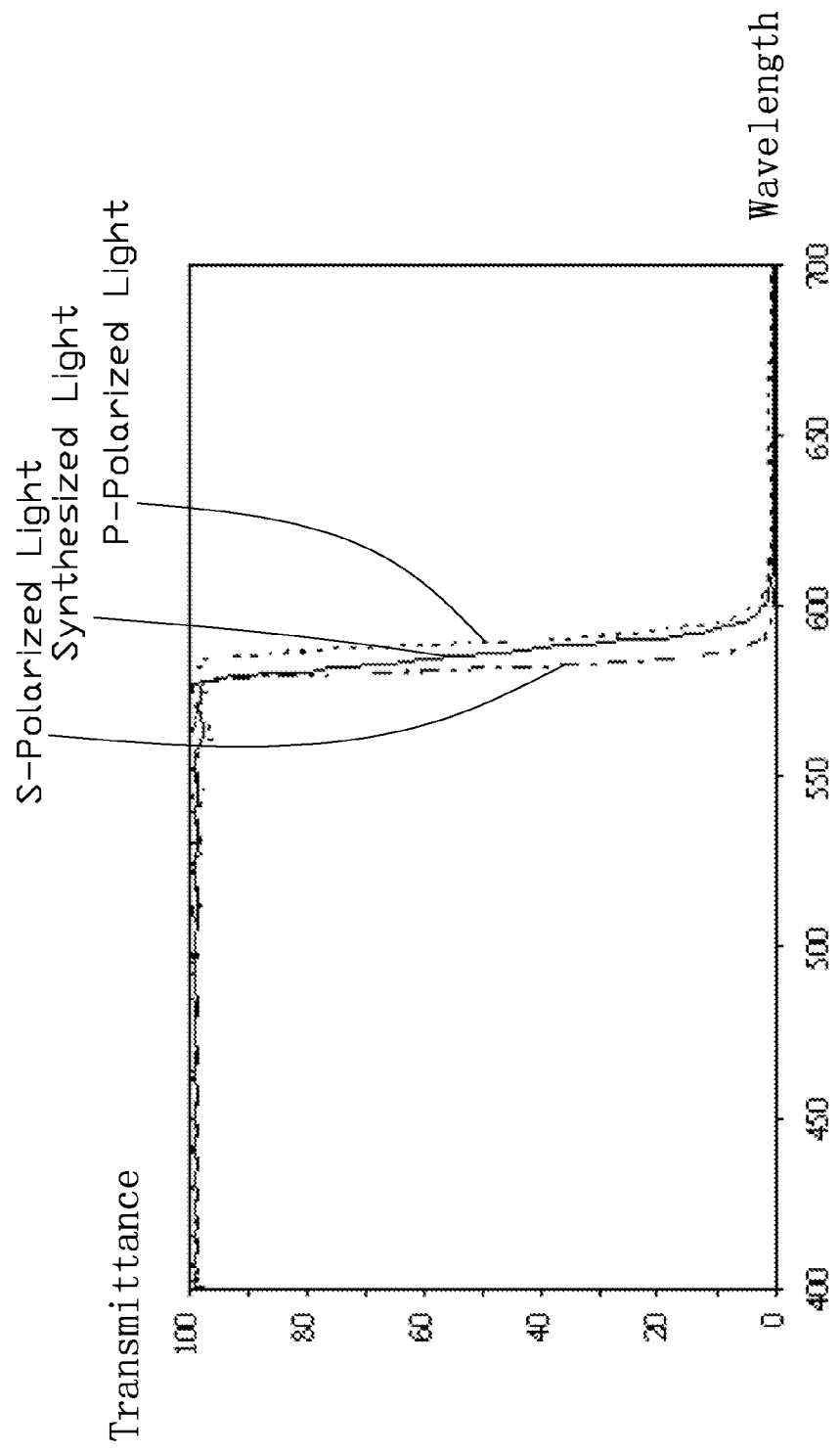
FIG. 3 is a graph showing transmittance characteristics of a dichroic mirror according to a second exemplary embodiment of the present invention.
Figure 4:
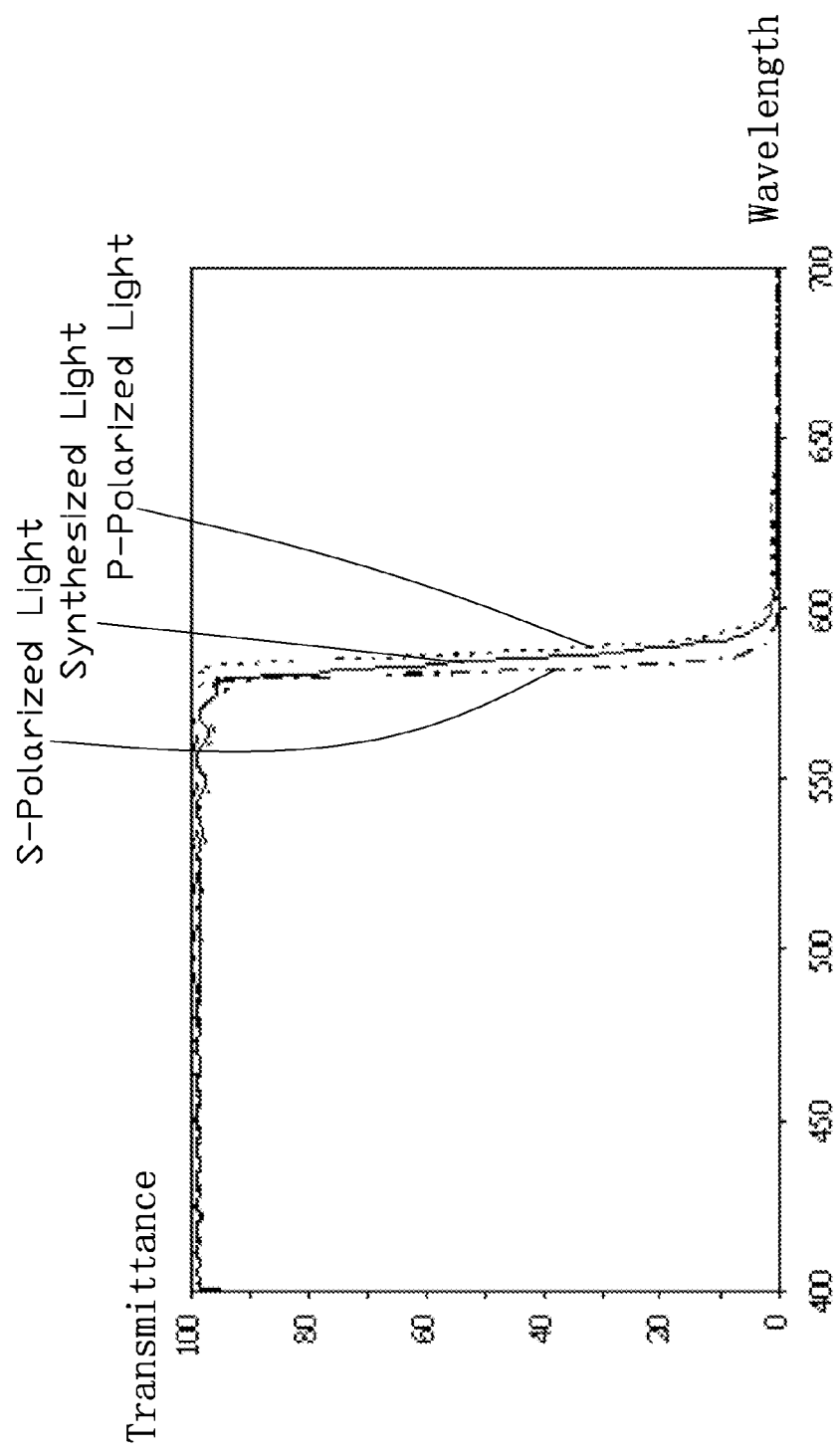
FIG. 4 is a graph showing transmittance characteristics of a dichroic mirror according to a third exemplary embodiment of the present invention.
Figure 5:
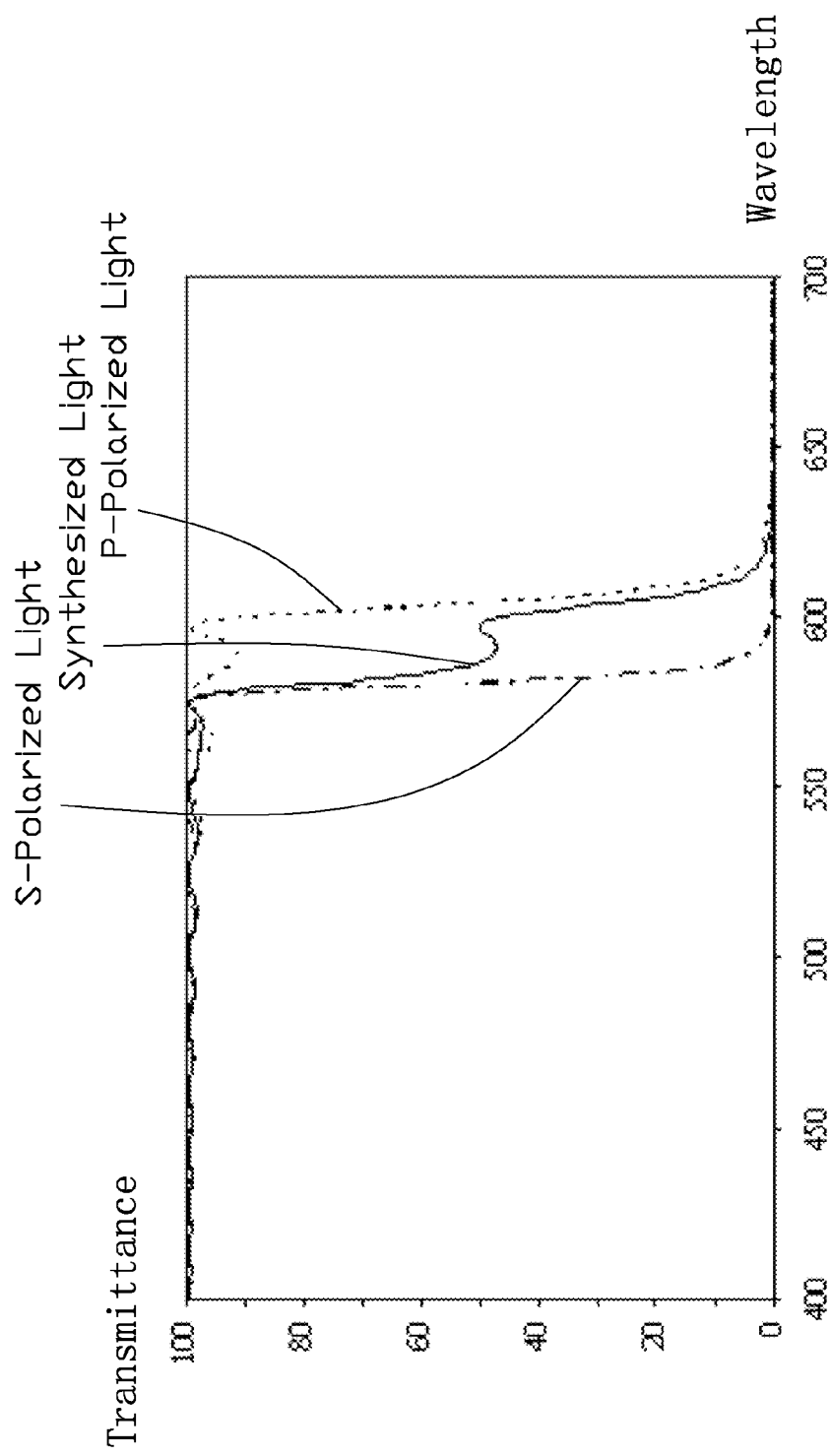
FIG. 5 is a graph showing transmittance characteristics of a dichroic mirror according to a related art.
Figure 6:
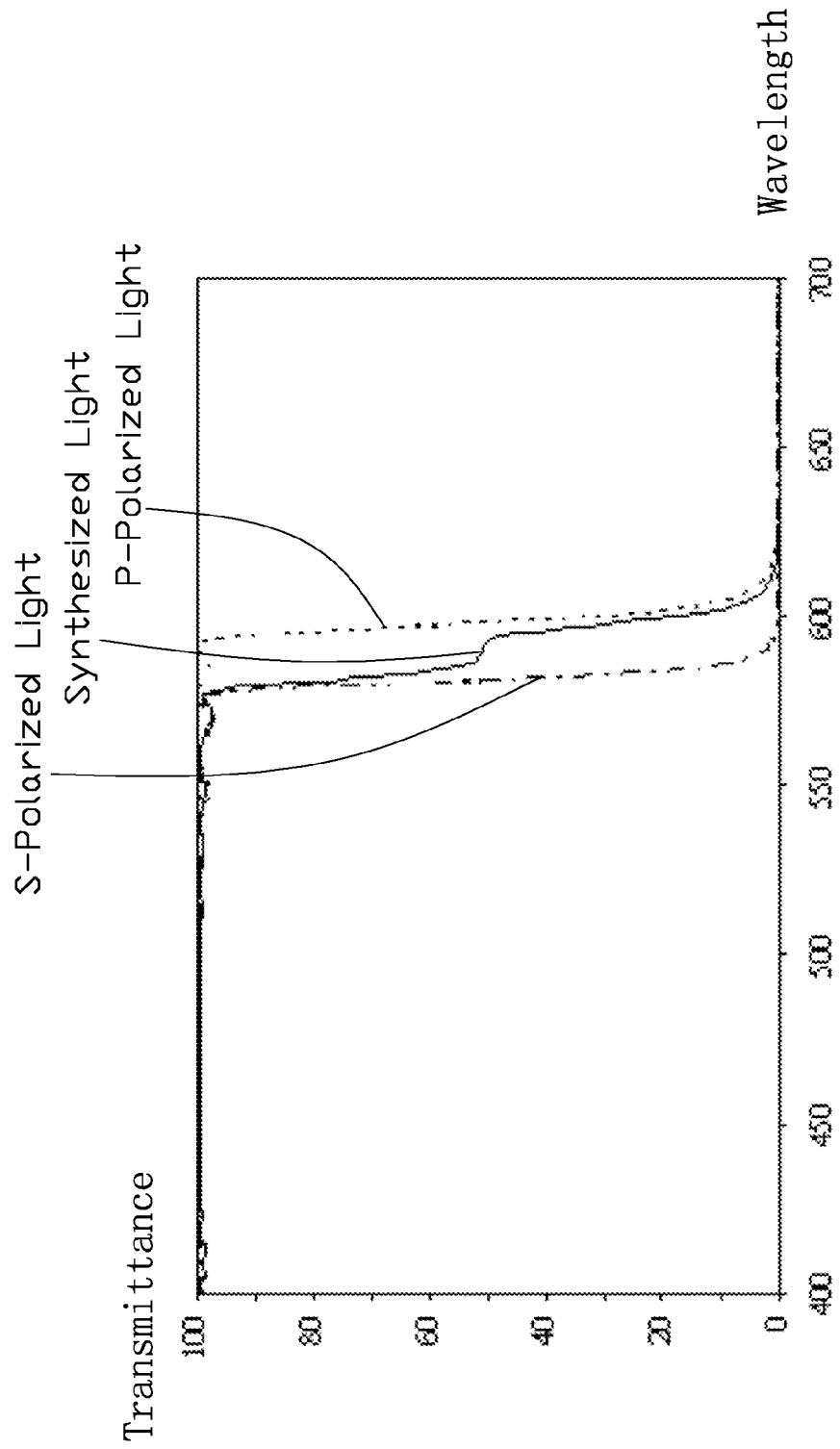
FIG. 6 is a graph showing transmittance characteristics of a dichroic mirror according to an another related art.

Examples of the dichroic mirror 100 will be described below with reference to FIGS. 2-4. It is to be understood that the invention is not limited to these examples.

The structure of dielectric multilayered film 10 of the dichroic mirror 100 according to a first exemplary example is represented by a formula $(2H0.5L)^{16}(0.7H1.4L0.7H)^{10}$, and the reference wavelength is 548 nm. Referring to FIG. 2, a graph shows transmittance characteristics of the dichroic mirror 100 according to a first exemplary example. The abscissa of the graph represents wavelengths and the ordinate of the graph represents transmittance. From the FIG. 2, we can see that the reflected S-polarized component wavelength range is essentially same to the reflected P-polarized component wavelength range.

The structure of dielectric multilayered film 10 of the dichroic mirror 100 according to a second exemplary example is represented by a formula $(2H0.35L)^{18}(0.7H1.4L0.7H)^{10}$, and the reference wavelength is 565 nm. Referring to FIG. 3, a graph shows transmittance characteristics of the dichroic mirror 100 according to a second exemplary example. The abscissa of the graph represents wavelengths and the ordinate of the graph represents transmittance. From the FIG. 3, we can see that the reflected S-polarized component wavelength range is essentially same to the reflected P-polarized component wavelength range.

The structure of dielectric multilayered film 10 of the dichroic mirror 100 according to a third exemplary example is represented by a formula $(2H0.25L)^{22}(0.7H1.4L0.7H)^{10}$, and the reference wavelength is 576 nm. Referring to FIG. 4, a graph shows transmittance characteristics of the dichroic mirror 100 according to a third exemplary example. The abscissa of the graph represents wavelengths and the ordinate of the graph represent transmittance. From the FIG. 4, we can see that the reflected S-polarized component wavelength range is essentially same to the reflected P-polarized component wavelength range. It should be noted that values of μ can be chosen according to need, keeping in mind that the lower the value of μ, the steeper the slope of the graph in the transmittance range.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A dichroic mirror comprising:
   a substrate; and
   a dielectric multilayered film formed on a surface of the substrate, the dielectric multilayered film, in order from the substrate side, comprising:
   a first period layer with a structure represented by a formula $(0.7H1.4L0.7H)^n$;
   a second period layer with a structure represented by a formula $(2H\mu L)^m$,
   wherein, H represents a high refractive index layer and L represents a low refractive index layer, H and L are set at ¼ lambda of a reference wavelength associated with the film, μ is a coefficient of the L, the m and n represent the number of repetitions of the structure, enclosed by the parentheses, forming the first period layer and second period layer respectively.

2. The dichroic mirror as claimed in claim 1, wherein the reference wavelength is in a range from 500 nm to 700 nm.

3. The dichroic mirror as claimed in claim 1, wherein the value of the m is in a range from 15 to 20.

4. The dichroic mirror as claimed in claim 1, wherein the value of the n is in a range from 8 to 12.

5. The dichroic mirror as claimed in claim 1, wherein the value of the μ is in a range from 0 to 1.

6. The dichroic mirror as claimed in claim 1, wherein the refractive index of the high refractive index material is in a range from 2.0 to 2.5.

7. The dichroic mirror as claimed in claim 1, wherein the high refractive index material is comprised of a material selected from a group consisting of $TiO_2$, $Ta_2O_5$, and $Nb_2O_5$.

8. The dichroic mirror as claimed in claim 1, wherein the refractive index of the low refractive index material is in a range from 1.4 to 1.5.

9. The dichroic mirror as claimed in claim 1, wherein the low refractive index material is comprised of a material selected from a group consisting of $MgF_2$ and $SiO_2$.

* * * * *